United States Patent [19]

Satoh

[11] Patent Number: 5,246,249
[45] Date of Patent: Sep. 21, 1993

[54] AIR BAG UNIT
[75] Inventor: Takeshi Satoh, Shiga, Japan
[73] Assignee: Takata Corporation, Tokyo, Japan
[21] Appl. No.: 820,677
[22] PCT Filed: May 30, 1990
[86] PCT No.: PCT/JP90/00696
   § 371 Date: Jan. 28, 1992
   § 102(e) Date: Jan. 28, 1992
[87] PCT Pub. No.: WO91/18761
   PCT Pub. Date: Dec. 12, 1991
[51] Int. Cl.$^5$ .......................................... B60R 21/16
[52] U.S. Cl. .................................... 280/731; 280/740
[58] Field of Search ............... 280/730, 731, 732, 736, 280/740, 743

[56] References Cited
U.S. PATENT DOCUMENTS
4,830,401 5/1989 Honda ............................... 280/736

FOREIGN PATENT DOCUMENTS
123354 8/1988 Japan .
123355 8/1988 Japan .
 41440 2/1989 Japan .
 45240 2/1990 Japan .

Primary Examiner—Kenneth R. Rice
Attorney, Agent, or Firm—Armstrong, Westerman, Hattori, McLeland & Naughton

[57] ABSTRACT

In an air bag unit, which comprises a retainer (6), an inflator (7, 15, 20, or 22) blowing gas from L blowing holes (7a) at the collision of the vehicle, and an air bag (8) inflated and developed by the gas thus blown out, said inflator (7, 15, 20, or 22) is provided with a mounting member (7d), which comprises an opposed wall (7b) placed face-to-face to the blowing holes (7a) and a mount (7c) with said retainer (6), and the mounting member (7d) and the retainer (6) are connected by connection members (9, 16, 18, 21, or 24) with the mounting end (8a) of said air bag (8) squeezed between said mounting member (7d) and said retainer (6). Because the inflator (7, 15, 20, or 22) itself is provided with an opposed wall (7b) placed face-to-face to the blowing holes (7a) and the mount (7c) with the retainer (6), there is no need to furnish special mounting member such as ring member used in the conventional type air bag unit. This makes it possible to reduce the number of component parts and to provide the air bag unit in compact and lightweight design as no special mounting member is required.

3 Claims, 6 Drawing Sheets

AIR BAG UNIT

FIELD OF THE INVENTION

The present invention relates to an air bag unit for preventing the secondary collision of an occupant of vehicle by inflating and developing an air bag when the vehicle is collided.

TECHNICAL BACKGROUND

In the past, an air bag unit has been used for protecting an occupant in a vehicle from the secondary collision (i.e. collision of the body of the occupant against car body by inertia), and such air bag unit is installed on the fixed portion of car body such as console box in front of the seat or on the back of the seat, or on the central portion of the steering wheel in front of the driver's seat.

This air bag unit is provided with an inflator with blowing holes, from which gas is blown out at the collision, and the air bag folded to cover the blowing holes is accommodated together with said inflator in a cover member, called module cover, which can be broken and developed in an emergency.

Such conventional type air bag unit is disclosed in the Japanese Unscreened Utility Model Publication No. 123355/1988. FIG. 7 shows an air bag unit disclosed in this publication.

As shown in FIG. 7, the air bag unit 1 comprises a gas generator 2, which is operated at the vehicle collision, generates gas and blows out the gas from the blowing holes 4 toward the direction perpendicular to the direction of the occupant, and a bag 5, the base 5a of which is fixed by a ring member 3 on the gas generator 2 as if it encloses said blowing holes 4 and which is inflated and expanded by the gas from said gas generator 2. Further, a lateral wall 3a facing the blowing holes 4 of said gas generator 2 is furnished on the side of said ring member 3.

In the air bag unit 1 with such arrangement, no thermal influence is exerted on the bag 5 and its strength can be maintained even when high temperature gas is continuously blown out from the gas generator 2 because the base 5a of the bag 5 is protected by the lateral wall 3a from the exposure to hot gas.

In the meantime, in the conventional type air bag unit 1 as described above, it is necessary to provide a lateral wall 3a facing to the blowing holes 4 of said gas generator 2 on the side of the ring member 3 for the purpose of protecting the base 5a of the bag 5 from hot gas.

The air bag unit for the driver is to be installed on the steering wheel in order to avoid the secondary collision of the occupant, e.g. the driver. When the above air bag unit is installed on the steering wheel, inertial weight is increased due to the ring member 3, and this leads to the decrease in the driving stability. Also, there is a problem that the unit must be larger because the ring member 3 must be furnished.

Further, there are the demands to reduce the cost and to increase the reliability by reducing the number of the component parts, while this could not be attained in the above air bag unit as described above.

To solve the above problems, the object of the present invention is to offer an air bag unit, which can be provided in compact and lightweight design and which can minimize the number of the component parts.

DISCLOSURE OF THE INVENTION

To attain the above object, the air bag unit according to the present invention comprises a retainer, an inflator mounted on said retainer and blowing gas from blowing holes when vehicle is collided, and an air bag inflated and expanded by the blown gas, and it is characterized in that said inflator is provided with a mounting member, comprising an opposed wall placed face-to-face to said blowing holes and a mount for the retainer, and said mounting member and the retainer are connected by connection members with the mounting end of said air bag squeezed between said mounting member and said retainer.

Because the inflator itself is furnished with a mounting member, which comprises an opposed wall placed face-to-face to the blowing holes and with a mount for the retainer, there is no need to furnish a special mounting member such as the ring member used in the conventional type air bag unit. Therefore, it is possible to provide an air bag unit in compact and lightweight design because the number of component parts is reduced and no special mounting member is required.

DETAILED DESCRIPTION OF THE PREFERRED EMBODIMENTS

Embodiments

Figure 1:
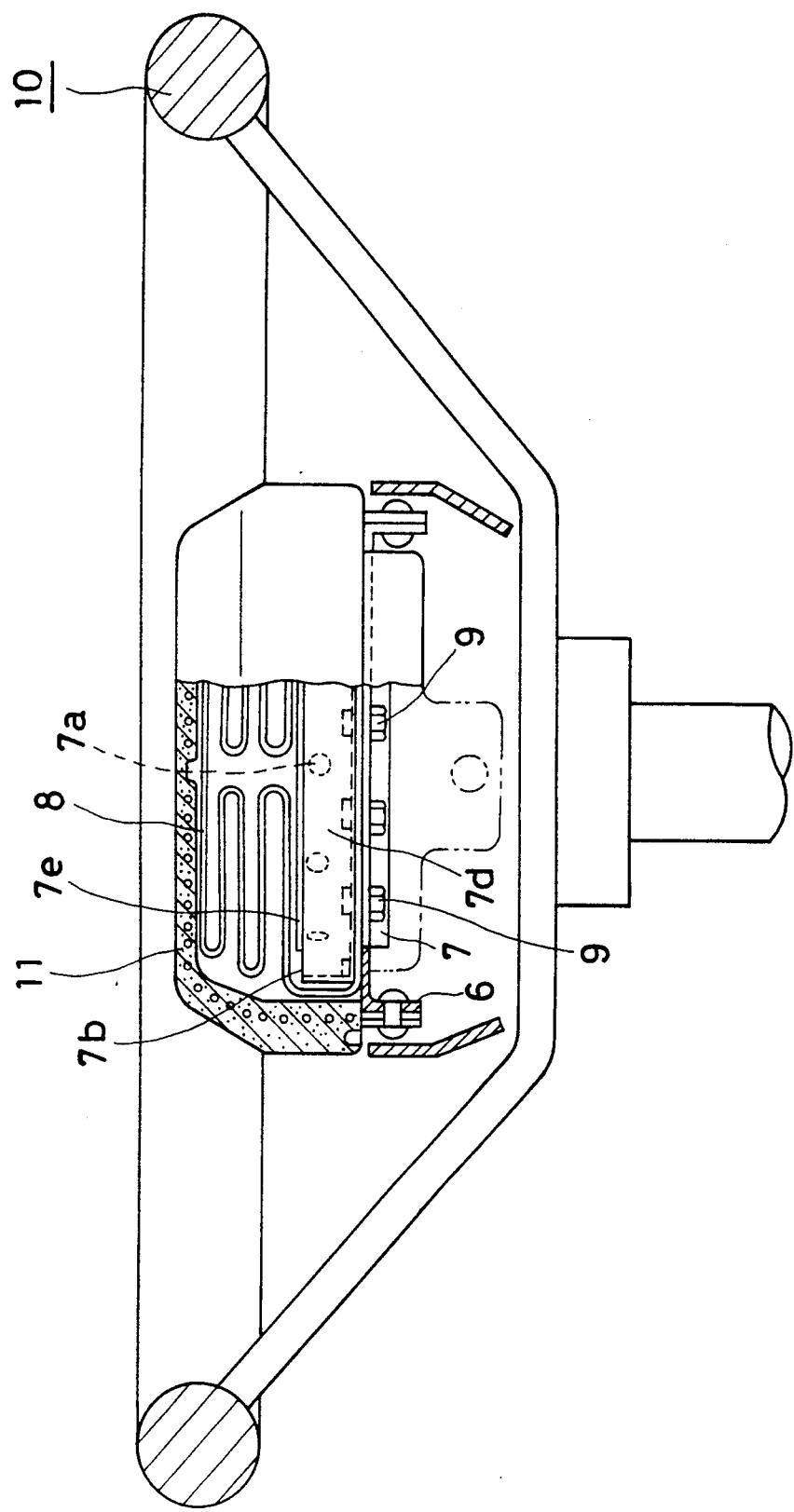
FIG. 1 is a partial cross-sectional view of an embodiment of the air bag unit according to the present invention as it is mounted on a steering wheel.
Figure 2:
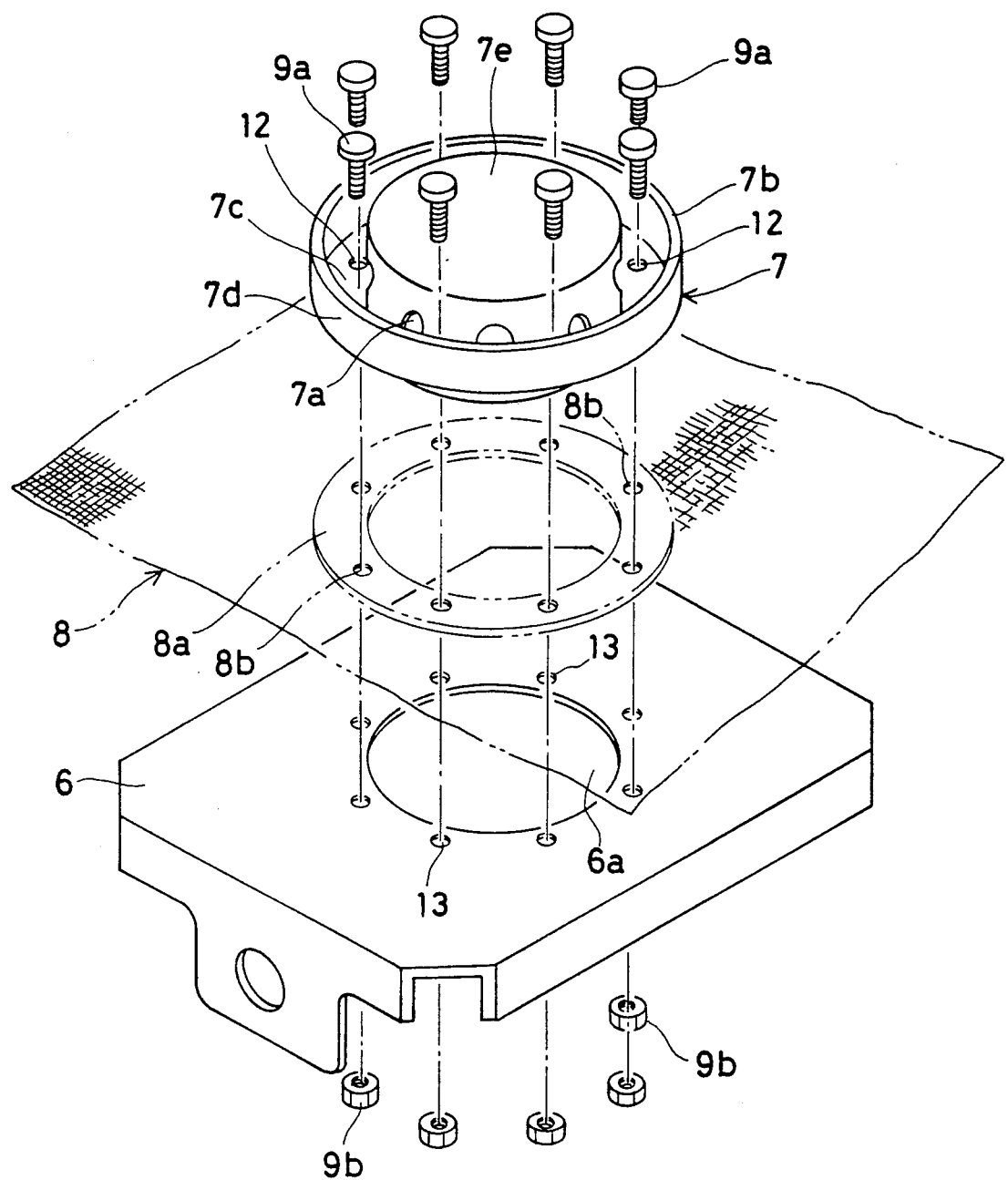
FIG. 2 is an exploded perspective view of an air bag unit in this embodiment.
Figure 3:
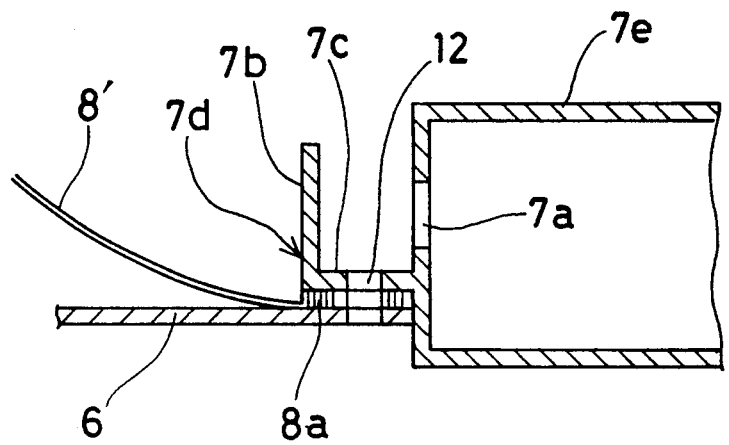
FIG. 3 is a partial cross-sectional view of this embodiment.

As shown in FIG. 1 to FIG. 3, the air bag unit according to this embodiment comprises a retainer 6 mounted on a steering wheel 10, an inflator 7 mounted on said retainer 6 and blowing gas from blowing holes 7a when the vehicle is collided, an air bag 8 inflated and developed by the blown gas, and a module cover 11 to accommodate the air bag 8. The inflator 7 is provided with a mounting member 7d, which comprises an opposed wall 7b placed face-to-face to the blowing holes 7a and a mount 7c for the retainer 6. The mounting member 7d and the retainer 6 are connected by connection members 9 with a mounting end 8a (shown in FIG. 2 and FIG. 3) of the air bag 8 squeezed between said mounting member 7d and the retainer 6.

The inflator 7 is furnished with a cylindrical main unit 7e where gas generating agent is sealed in. On the side of this main unit 7e, a plurality of circular blowing holes 7a, 7a, ... are formed with certain spacings, and gas is blown out of these blowing holes 7a. Also, on the side of the main unit 7e, a ring-like mounting member 7d is integrally mounted with main unit 7e below the blowing holes 7a.

The mounting member 7d is furnished in the direction perpendicular to the side of the main unit 7e and comprises a mount 7c in contact with the retainer 6 and an opposed wall 7b placed on outer periphery of the mount 7c in parallel to and above the side of the main unit 7e. On the mount 7c, a plurality of holes for connection members 12, 12, . . . are provided in peripheral direction with equal spacings. Also, on the mounting end 8a of the retainer 6 and the air bag 8, the holes for connection members corresponding to the holes for connection member 12 are provided. As shown in FIG.. 3, the opposed wall 7b is placed face-to-face to all blowing holes 7a.

The retainer 6 is in approximately rectangular shape and is provided with a through-hole 6a having the diameter approximately equal to outer diameter of the main unit 7e of the inflator 7. Around this through-hole 6a, the holes 13 for connection members are furnished as many as the holes for connection members 12, which are formed on the mount 7c. The above module cover 11 is mounted via a folded piece on outer edge of the retainer 6.

The air bag 8 is made of the flexible and airtight material, which is a woven cloth coated with rubber or synthetic resin. The mounting end 8a is reinforced by integrally overlapping the reinforcement cloths made of the same material by bonding or sewing. On the mounting end 8a, the connection member holes 8b are furnished as many as the connection member holes 12 on the mount 7c.

The mounting end 8a of the air bag 8 is squeezed between the retainer 6 and the mount 7c. The serrated bolts 9a, i.e. connection members 9, are inserted into these connection member holes 13, 12 and 8b, and the connection member holes 13, 12 and 8b of retainer 6, the mount 7c and the mounting end 8a are aligned with each other so that the retainer 6, inflator 7 and the mounting end 8a of the air bag 8 are connected with each other by these bolts 9a.

Next, description is given on the assembling process of the air bag unit with the above arrangement.

First, the serrated bolts 9a are inserted into the connection member holes 12 on the mount 7c of the inflator 7. In this case, the bolts 9a are not rotated with the nuts 9b even when they are engaged with the nuts 9b because serration (not shown) is formed on each bolt for preventing the rotation.

Next, the inflator 7 is placed in the air bag 8, and the tips of the serrated bolts 9a are inserted into the connection member holes 8b on the mounting end 8a of the air bag 8. Further, each of the tips is inserted into the connection member holes 13 on the retainer 6. From below the retainer 6, nuts 9b are engaged with the serrated bolts 9a, and the mounting end 8a of the air bag 8 is tightened between the lower surface of the mount 7c of the inflator 7 and the upper surface of the retainer 6 in the pressurizing direction.

Finally, as shown in FIG. 1, the air bag 8 is folded up in bellows-like form, and the module cover 11 is mounted. Thus, the assembling process of the air bag unit is completed.

Assuming that a vehicle provided with such air bag unit is collided, hot gas blown out of the blowing holes 7a of the inflator 7 at the collision is blown against the opposed wall 7b on the mounting member 7d. Therefore, hot gas does not come into contact with the air bag 8 itself, and the air bag 8 is not thermally affected even when hot gas from the inflator 7 is continuously blown out, and its strength is maintained. Further, the flexural rigidity of the mounting member 7d with the opposed wall 7b is increased in the direction toward the opposed wall 7b. The tightening force by the connection members is uniformly applied on the mount 7c, and the sealing property on the mounting end 8a of the air bag 8 is also increased.

According to the air bag unit as described above, there is no need to have ring member for mounting the air bag as it was essential in the past, and it is possible to reduce the number of component parts and to mount the air bag itself perfectly on the inflator. Therefore, when such air bag unit is mounted on steering wheel, driving stability can be improved because the inertial weight is reduced. Further, the flange of the inflator in the conventional arrangement is placed on lower surface of the retainer 6, while, in the present embodiment, the mounting member 7d is arranged on upper surface of the retainer 6. As the result, the dimension of the portion of the main unit 7e protruding below the retainer 6 can be reduced, and this increases the degree of freedom in the designing of the steering unit.

In addition, it is possible to reduce the cost and to increase the reliability by decreasing the number of the component parts.

Next, description is given on the other embodiments of this invention.

Figure 4:
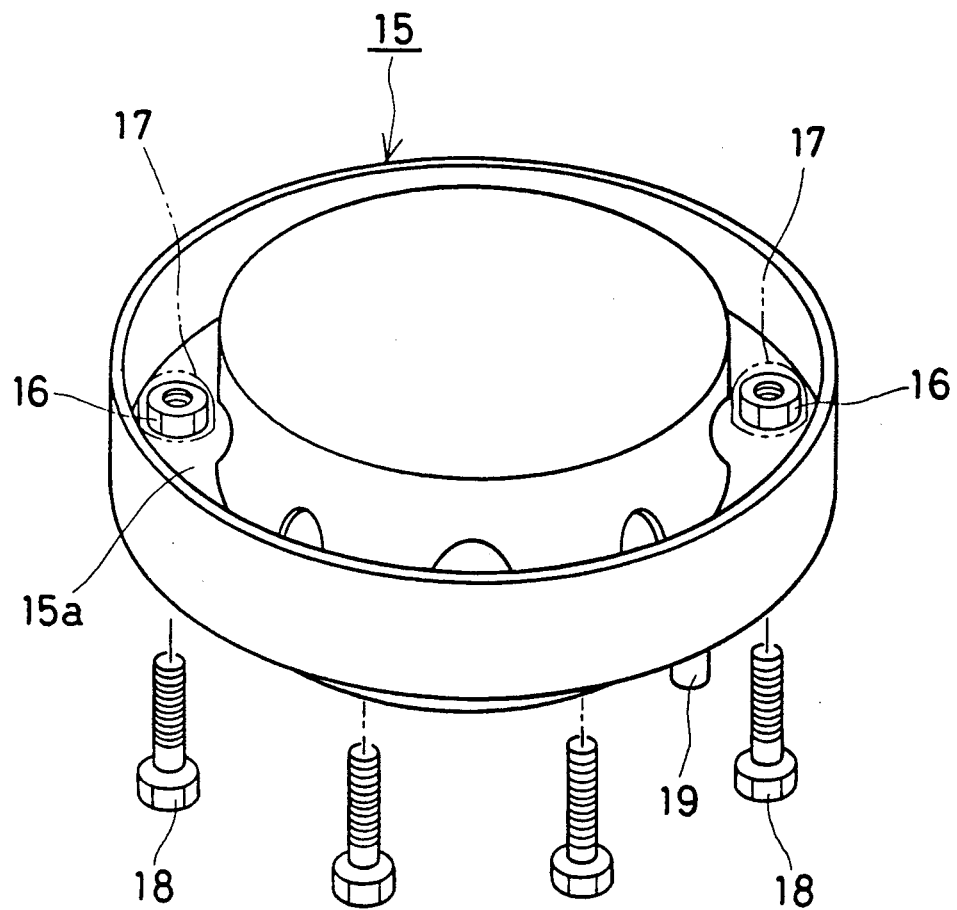
FIG. 4 to FIG. 6 are exploded perspective views showing the other embodiments of the inflator and connection member.

As shown in FIG. 4, connection member holes in the present embodiment are provided in peripheral direction with equal spacings as described above on the mount 15a of the inflator 15. On the top of each of the connection member holes, nuts 16 are fixed by welding. Each of the nuts 16 is covered with sealing material 17 made of soft rubber. Further, a positioning member 19 is provided on lower outer edge of the mount 15a. In this case, the insertion holes to receive the above positioning member 19 are provided at the predetermined positions of the mounting end 8a of the air bag 8 and the retainer 6.

To assemble the air bag unit using such inflator 15, said inflator 15 is inserted into the air bag 8 and is positioned on the mounting end 8a. Then, the retainer 6 is placed together with the air bag 8. In this case, relative deviation can be prevented by the positioning member 19.

The bolts 18 are engaged with nuts from lower side of the retainer 6, and the mounting end 8a of the air bag 8 is tightened between the lower surface of the mount 15a of the inflator 15 and the upper surface of the retainer 6 in the pressurizing direction. In this case, the tips of the bolts 18 may protrude over the nut 16, but inner surface of the air bag 8 is not damaged by the tips of the bolts 18 because the tips of the bolts 18 are covered with sealing material 17.

By the air bag unit using such inflator, it is possible to obtain the same effect as that of the embodiment already described.

Next, description is given on still another embodiment of the present invention.

Figure 5:
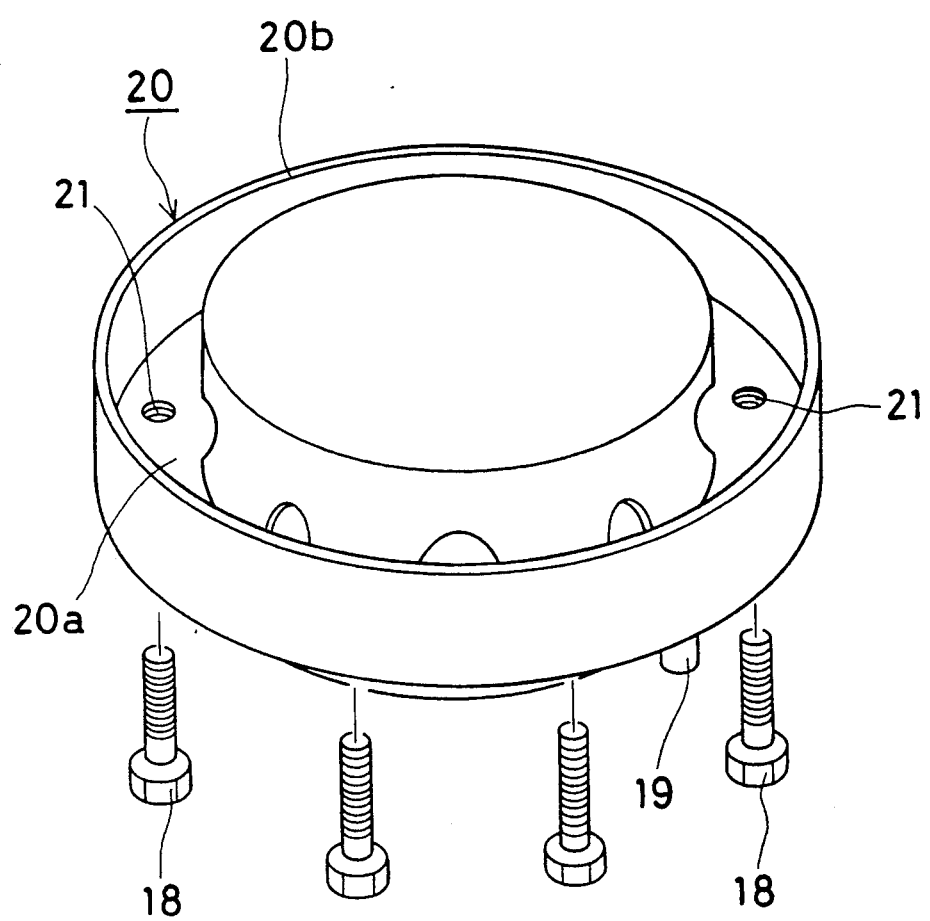

As shown in FIG. 5, on the inflator 20 of this embodiment, female threads 21 wit the same function are provided on the mounting surface 20a of the mounting member 20b in peripheral direction with equal spacings instead of the nuts 16 used in the inflator 15 of FIG. 4. The other arrangement is the same as in the inflator 15 of FIG. 4.

In the inflator 20 with such arrangement, the same effect as that of the embodiment already described can be obtained. It is further advantageous in that there is no need to provide the nuts and the number of the component parts can be reduced.

Next, description is given on yet still another embodiment of the invention.

Figure 6:
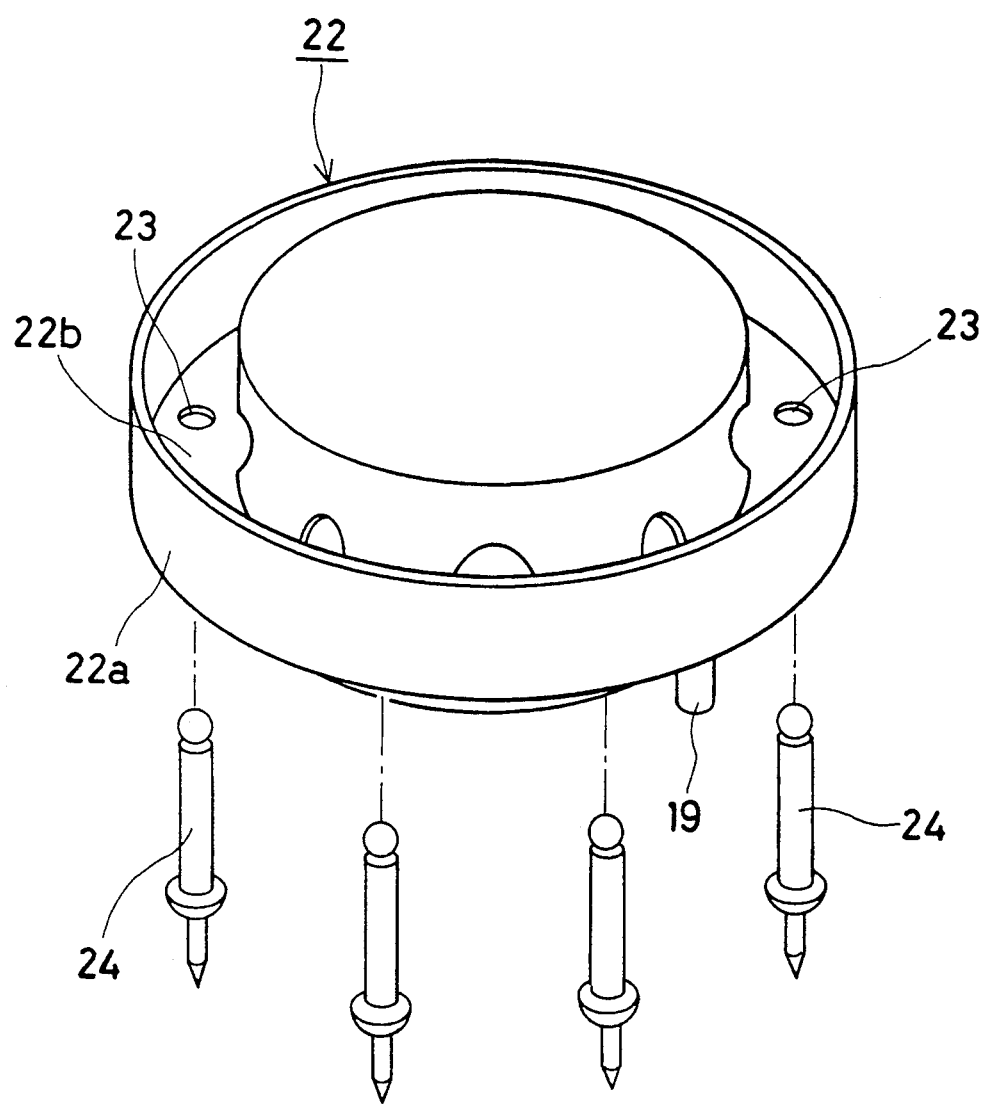
Figure 7:
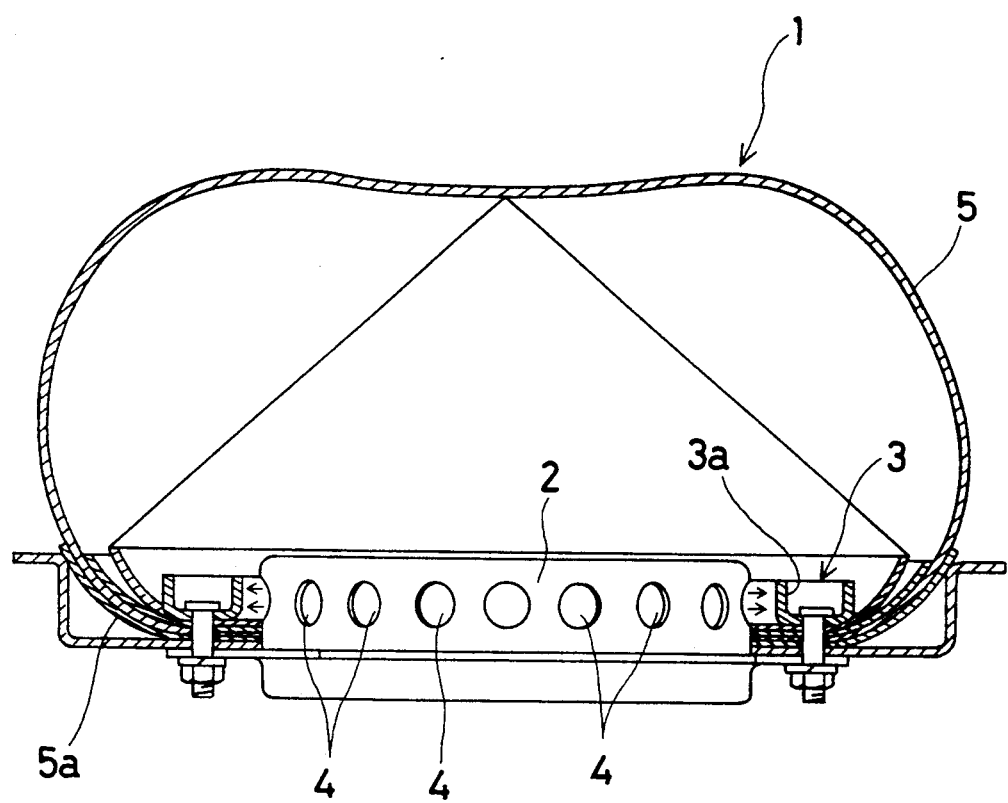
FIG. 7 is a cross-sectional view showing a conventional type air bag unit.

As shown in FIG. 6, on the inflator 22 of this embodiment, through-holes 23 are furnished on the mounting surface 22b of the mounting member 22a in peripheral direction with equal spacings. Particularly, in the present embodiment, blind revets 24 are inserted into the through holes 23 to connect the mount of the inflator, the mounting end of the air bag and the retainer as described above.

By the air bag unit with such arrangement, it is possible to obtain the same effect and the assembling time can be shortened by the use of blind rivets.

In each of the embodiments as described above, 8 through-holes or female threads are provided on the mount of the inflator, whereas the present invention is not limited to such arrangement, and the number of connection member holes can be determined adequately by taking the strength of the connection members and the material of the inflator into account. Also, the unit according to the present invention may be mounted on the fixed portion of car body such as console box in front part of the car or on the back of the seat in addition to the steering wheel as described above. Even in such cases, almost the same effect can be obtained.

The opposed wall formed on the inflator is shown as protruding over the outer edge of the mounting member in each of the above embodiments, while, the portion in the middle of the outer edge of the mounting surface may be protruded in convex shape.

APPLICABILITY IN THE INDUSTRY

The air bag of the air bag unit according to the present invention can be used on a vehicle and can be applied for the protection of the occupant by absorbing shock, which occurs at the collision of the vehicle.

What is claimed is:

1. An air bag unit for a vehicle, comprising:
   a retainer;
   an inflator member mounted on said retainer;
   blowing holes disposed in said inflator member for blowing gas when the vehicle is in a collision;
   an air bag which is inflatable by the gas blow out of said blowing holes;
   a mounting member integrally formed in said inflator member, said mounting member having an opposed wall placed face-to-face to the blowing holes and a mount for said retainer; and
   connection members for connecting the mounting member and the retainer with a mounting end of said air bag squeezed between said mounting member and said retainer.

2. The air bag unit of claim 1, wherein said inflator member further includes a central cylindrical main unit, said blow holes being provided on a perimeter side surface of the central cylindrical main unit.

3. The air bag unit of claim 2, wherein said inflator member is a single integrally formed member.

* * * * *